United States Patent [19]

Wishart

[11] 4,411,721
[45] Oct. 25, 1983

[54] APPARATUS AND METHOD FOR ATTACHING FASTENER TAPES

[75] Inventor: John G. Wishart, St. Joseph, Mo.

[73] Assignee: The Mead Corporation, Dayton, Ohio

[21] Appl. No.: 352,285

[22] Filed: Feb. 25, 1982

[51] Int. Cl.³ .................. B32B 31/04; B32B 31/16
[52] U.S. Cl. .................. 156/73.1; 156/256; 156/263; 156/511; 156/521; 156/580.1; 156/580.2
[58] Field of Search .................. 156/73.1, 256, 263, 156/511, 517, 521, 572, 580.1, 580.2, 506

[56] References Cited

U.S. PATENT DOCUMENTS

| | | | |
|---|---|---|---|
| 3,464,102 | 9/1969 | Soloff | 156/580.2 |
| 3,607,579 | 9/1971 | Enskat et al. | 156/571 |
| 3,753,836 | 8/1973 | Buckholz | 156/521 |
| 3,773,597 | 11/1973 | Captain et al. | 156/499 |
| 3,943,029 | 3/1976 | Mundt et al. | 156/580.1 |
| 4,019,948 | 4/1977 | Hudalla et al. | 156/579 |
| 4,045,271 | 8/1977 | Clark et al. | 156/515 |
| 4,120,718 | 10/1978 | Hudalla et al. | 156/499 |
| 4,194,937 | 3/1980 | Hashmall | 156/73.1 |
| 4,230,520 | 10/1980 | Morgan | 156/506 |
| 4,256,529 | 3/1981 | Clarke et al. | 156/515 |
| 4,288,280 | 9/1981 | Morin | 156/517 |

Primary Examiner—Michael G. Wityshyn
Attorney, Agent, or Firm—Biebel, French & Nauman

[57] ABSTRACT

A tape attachment apparatus is provided for automatically securing adhesive-backed hook or loop-type fastener tape patches to a substrate. The apparatus includes a work station where one or more patches are applied using ultrasonic welding devices. Fastener tape is supplied to the work station by a tape feed mechanism which includes a knife for severing the tape into patches of predetermined size and a transport arm for receiving a patch and transporting it to the horn of the ultrasonic welding device.

15 Claims, 15 Drawing Figures

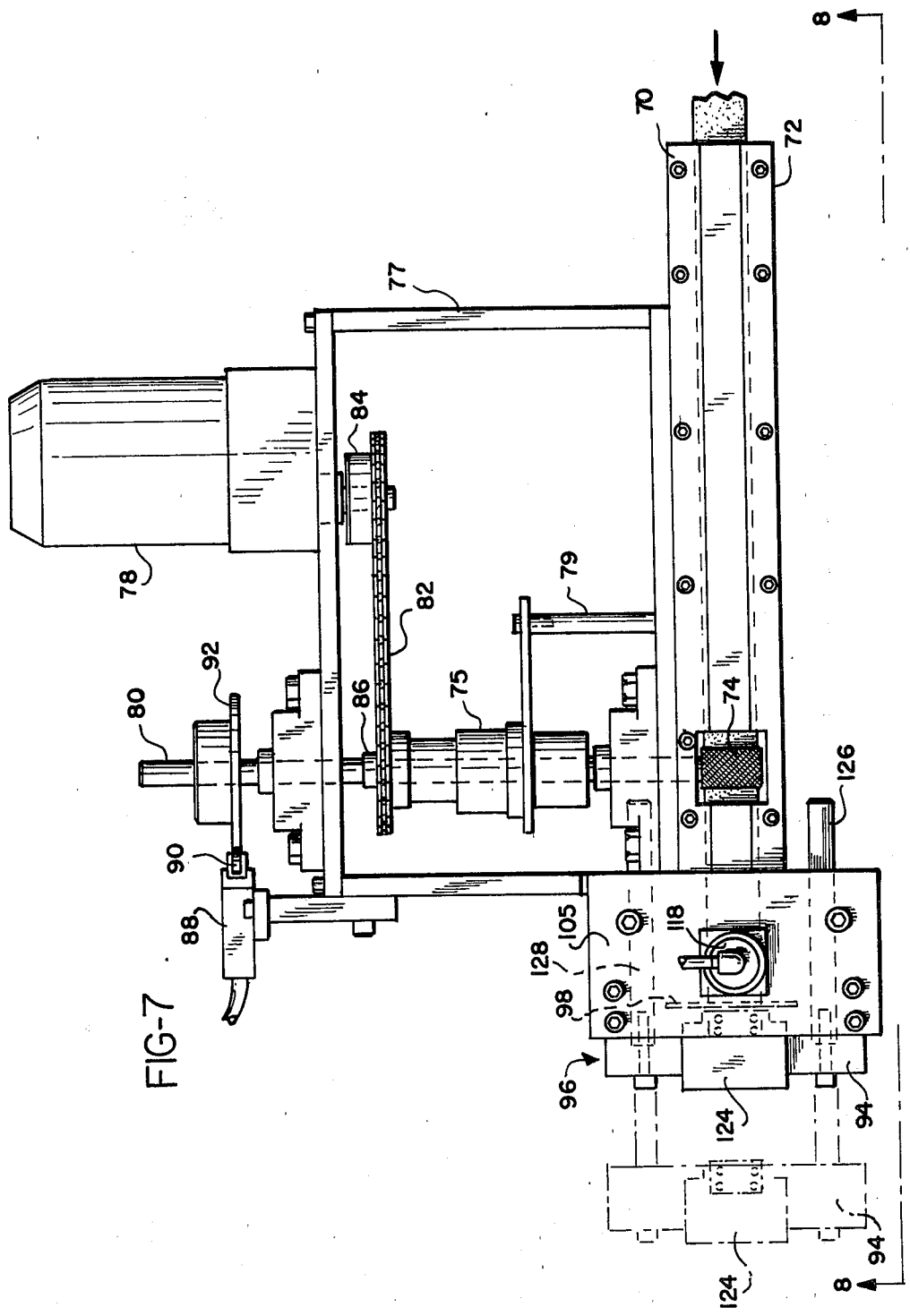

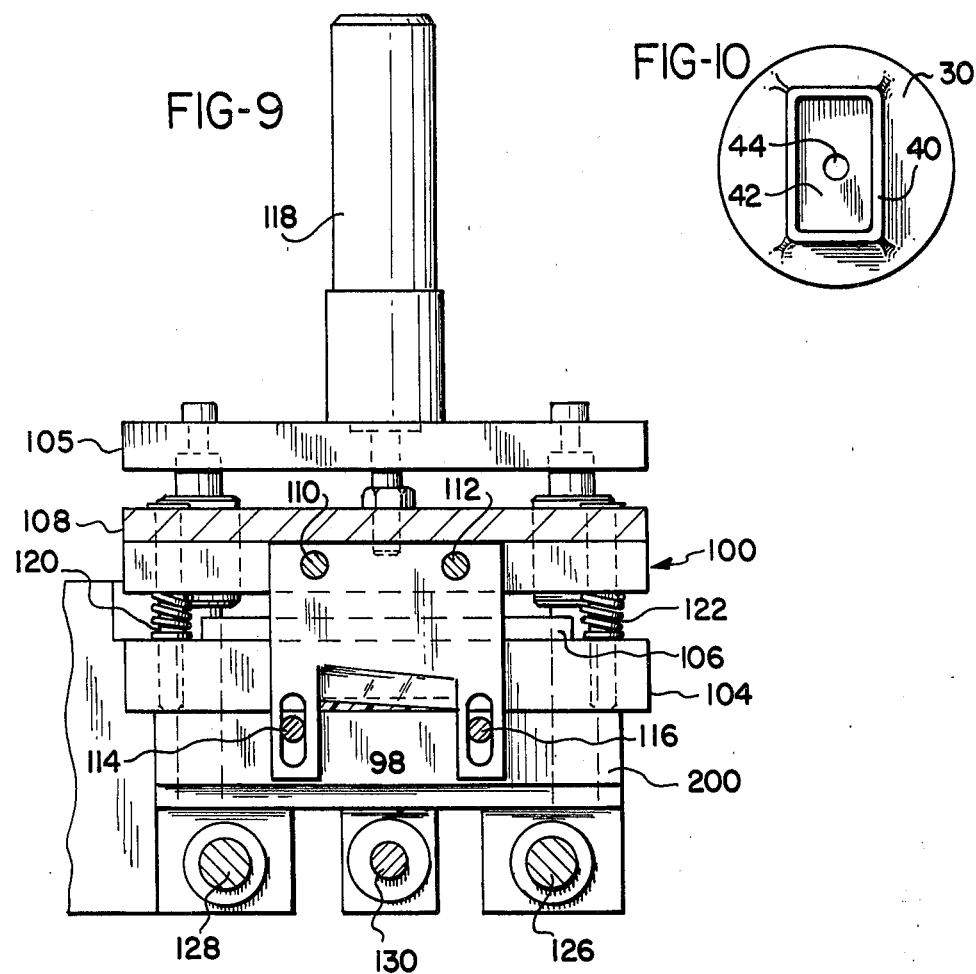

APPARATUS AND METHOD FOR ATTACHING FASTENER TAPES

BACKGROUND OF THE INVENTION

This invention relates to an apparatus of the type which applies patches of hook or loop fastener tape to a substrate. Such apparatuses have been developed to apply varying lengths of adhesive backed fastener tapes to a variety of substrates. For example, apparatuses are known which dispense fibrous tapes having a pressure-sensitive adhesive coated on the back thereof for application to a substrate. However, some substrate surfaces will not retain pressure-sensitive adhesive coated fastener tapes. For example, vinyl covered loose leaf notebook binders are in many cases not suitable substrates because plasticizers present in the vinyl covering attack the adhesive and cause it eventually to lose its adhesive properties.

Apparatuses for applying fibrous tapes having heat activatable adhesive coatings are also known. For example, Captain et al, U.S. Pat. No. 3,773,597, disclose a heating apparatus utilizing a resistance heating element interposed between a substrate and a fibrous tape to be applied to a substrate. Hudalla et al, U.S. Pat. Nos. 4,019,948 and 4,120,718, teach an applicator for a tape coated with a heat-activatable adhesive which utilizes a wire bristle brush-type heating element to activate the adhesive. However, there are problems in the use of radiant or convective heating elements to apply fibrous tapes. The tapes themselves, as well as the substrates, may be sensitive to excessive heat, the evenness of heating is difficult to control, and the heating process is relatively slow (i.e., requires several seconds).

More recently, ultrasonic energy has been utilized to heat seal seams in fabric tapes containing hook and eye fasteners. For example, Hashmall, U.S. Pat. No. 4,194,937, and Clarke et al, U.S. Pat. Nos. 4,045,271 and 4,256,529 all disclose apparatuses which use ultrasonic welding techniques to heat seal a seam along a continuous web of fabric tape to secure hook and eye fasteners. However, those techniques are limited to heat sealing a portion of a substrate to itself to secure a hook or fastening element therein.

Accordingly, the need still exists in the art for an apparatus which can automatically and rapidly secure patches of hook or loop fastener tape to a substrate without damaging the patch or the substrate due to excessive or uneven application of heat.

SUMMARY OF THE INVENTION

In accordance with the present invention an apparatus is provided for automatically applying one or more patches of tape having a hook or loop fastener surface to a substrate. The one or more patches are applied at a work station where an ultrasonic welding device having a horn applies ultrasonic vibratory energy and moderate pressure to the patch. This activates a heat-activatable adhesive composition on the back of the patch and secures it to the substrate. Because ultrasonic energy is utilized, the heating of the patch is rapid and even, enabling a high production rate. Additionally, because of the rapid heating of the patch and the short application time, heat-sensitive substrates such as vinyl-covered notebook binders and the like are not adversely affected.

The hook or loop tape is supplied to the work station as a continuous web or roll which is severed at predetermined intervals to provide appropriately sized patches. The tape is fed onto a moveable transport arm and severed by a knife. The transport arm is then moved automatically to a position immediately beneath the horn of the ultrasonic welding device. In a preferred embodiment of the invention, both the transport arm and the horn are connected to sources of vacuum to hold the patch in position. The patch is transferred to the horn by initiating a vacuum at the horn and terminating the drawing of a vacuum at the transport arm.

The transport arm then returns to its initial position to receive another patch, and the horn is lowered to bring the bottom surface of the patch into contact with the substrate. Ultrasonic vibratory energy and pressure are then applied to the patch to activate the adhesive and secure it to the substrate.

In a preferred form of the invention, a supply of suitable substrates, such as notebook binder covers, are kept in a hopper and fed in sequence to the work station. This is accomplished by means of a shuttle plate which pushes individual binder covers between a pair of feed rollers. The feed rollers deposit the covers onto a chain or conveyor drive mechanism which advances each cover in turn to the work station. The same chain or conveyor drive then advances the covers with patches to a collecting bin or the like.

Preferably, the work station has two ultrasonic welding devices, one located above the substrate and one located below the substrate. In that manner, a patch having a hook-type fastener may be applied to one side of the substrate while a corresponding loop-type fastener patch is applied to the opposite side of the substrate. In the case of notebook binder covers, this enables the two patches to cooperatively secure the cover in a closed configuration when the cover flap carrying one patch is folded over and mated to a patch on the cover surface.

Accordingly, it is an object of the present invention to provide an apparatus which rapidly and uniformly heats patches to secure them to substrates, even heat-sensitive substrates. The apparatus of the present invention enables rapid production rates and eliminates the need for laborious and time-consuming manual application of such patches. These and other objects and advantages of the invention will be apparent from the following description, the accompanying drawings, and the appended claims.

BRIEF DESCRIPTION OF THE DRAWINGS

FIG. 7 is an enlarged elevational top view of the tape transport mechanism used by the apparatus of the present invention;

FIG. 9 is a side elevational view of the knife assembly taken along line 9—9 in FIG. 8; and FIG. 10 is a view of the bottom of the ultrasonic welding horn taken along line 10—10 in FIG. 8.

DESCRIPTION OF THE PREFERRED EMBODIMENTS

Figure 1:
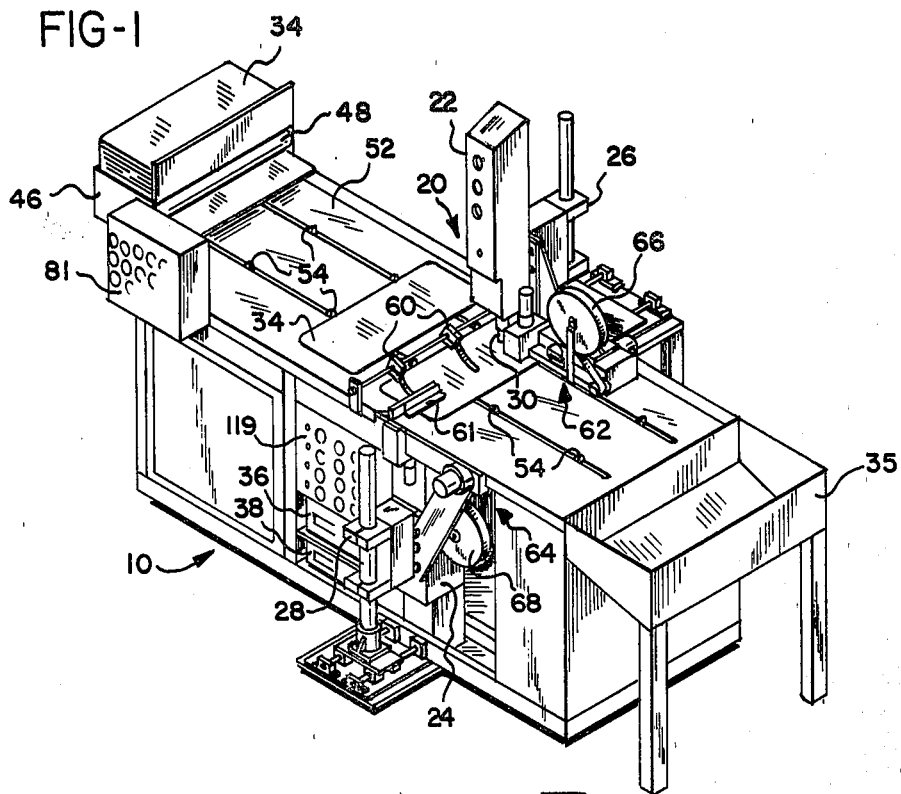
FIG. 1 is a perspective view of an apparatus constructed in accordance with the present invention.

Referring now to FIGS. 1-4, a preferred embodiment of the apparatus of the present invention is illustrated. As shown, the tape attachment apparatus 10 has a work station generally indicated by 20 having a pair of ultrasonic welding devices 22 and 24. Such ultrasonic welding devices may be commercially available devices such as Branson Model 801L Ultrasonic Welding System from Branson Sonic Power Company, Danbury, Conn.

Each welding device 22, 24 is mounted on a carriage 26, 28 which permits vertical movement of the welder from a first position to an activated position applying ultrasonic vibratory energy and pressure through respective horns 30, 32 to apply a patch to a substrate 34. Individual power supplies and ultrasonic actuator control devices 36, 38 are connected to individual welding devices 22, 24, respectively.

As best shown in FIG. 10, the end portion of horn 30 has a patch contacting surface 40 extending substantially around its entire periphery. A recessed central portion 42 leads to an orifice 44 which is connected to a source of vacuum (not shown). By using this horn configuration, the heat generated by the ultrasonic energy activates the adhesive on the back of the patch around the edges to cause the patch to be secured to the substrate while avoiding the possibility of any heat damage to the major portion of the hook or loop fabric patch. Alternatively, other surface contacting configurations may be utilized such as the use of a plurality of patch contacting points on the horn to activate the heat-activatable adhesive on the back of the patch.

Referring back now to FIGS. 1-4, substrates 34, such as vinyl-covered notebook binder covers, in their flat extended configuration are loaded into hopper 46. A shuttle plate (not shown) pushes individual substrates 34 between a pair of feed rollers 48, 50 which deposit the substrates 34 onto work table 52. The substrates 34 are then sequentially transported to work station 20 by pushers 54 extending upwardly from table 52. Indexing fingers or pushers 54 are driven by chain 56 operated by motor 58. Holddown devices 60 apply a slight downward pressure on substrates 34 to insure that they are in a flat, horizontal position when they reach work station 20. An anvil 61 is positioned above the substrate as shown to provide support as welding horn 32 applies a patch from beneath the table.

At work station 20, patches of a hook or loop-type fastener tape such as Velcro (trademark) tape are secured to substrates 34 by ultrasonic welding devices 22 and 24, respectively. As shown, these welding devices apply patches to opposite sides of a substrate 34. In the case where substrate 34 is a notebook binder cover, the finished binder can be closed by bending over a flap located on the cover containing either a hook or loop patch and mating it with a complementary loop or hook patch located on the side of the cover. It is not critical which welding device applies which type (i.e., hook or loop) of fastener tape. Moreover, it is also within the scope of the present invention for the apparatus to apply only a single patch, or utilize additional welding devices to apply as many patches in one operation as desired.

After the patch or patches have been applied, the substrates are collected in bin 35.

Figure 8:
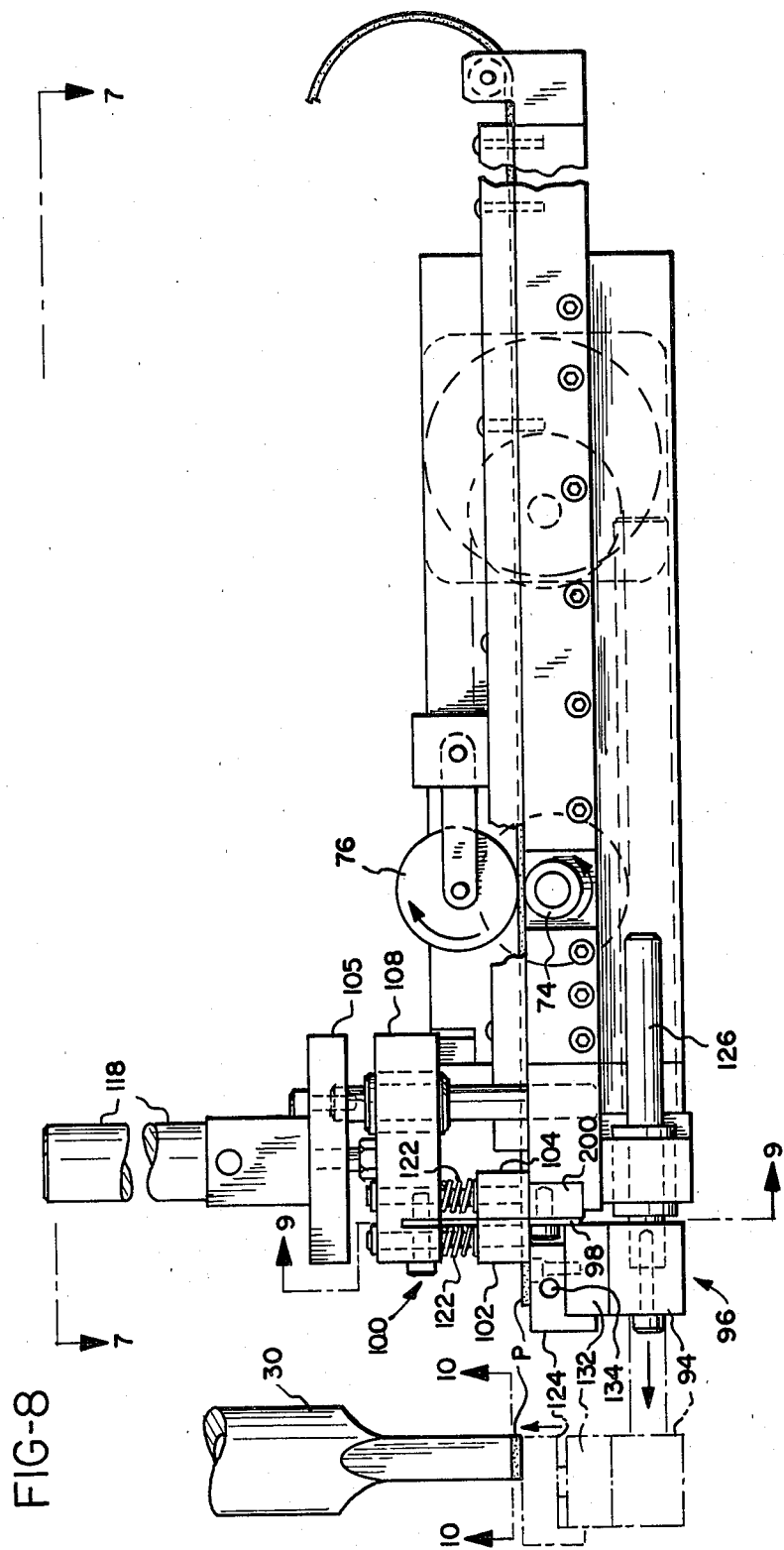
FIG. 8 is an elevational side view taken along line 8—8 in FIG. 7.

The patches of tape are supplied to work station 20 and individual welding devices 22, 24 by tape feed apparatuses indicated generally by 62 and 64, respectively. As best shown in FIGS. 7 and 8, a continuous web or roll of tape is supplied from tape wheel 66 to tape feed apparatus 62 through guide rails 70, 72. Tape feed apparatus 64 operates in a corresponding manner but is not separately illustrated.

As illustrated in FIGS. 7 and 8, the tape is fed to the work station by a feed roller 74. An idler roller 76 maintains pressure on the tape as it is fed by feed roller 74. Predetermined amounts of tape are sequentially fed through the apparatus by means of a motor driven clutch 75 which is supported in frame 77 by support 79. Motor 78 continuously drives chain 82 and sprockets 84 and 86. A solenoid or the like (not shown) is periodically activated to cause clutch 75 to engage shaft 80 (onto which feed roller 74 is mounted) and cause it to rotate a predetermined amount, for example ¼ turn. A roller switch 88 having a wheel 90 engaging clutch cam 92 (i.e., a notched wheel) provides an electrical signal to the control circuits of the machine when it detects that shaft 80 has been rotated the proper distance. It has been found that use of a one inch wide tape which is fed forward at approximately ⅜ inch intervals results in a patch of a suitable size for securing to notebook binder covers. All of the electrical devices, including motors, solenoids, and switches are controlled from electrical control panel 81.

After a predetermined length of tape has been fed onto vacuum pad 124 of transport arm 96, it is severed by knife 98 in knife subassembly 100. As best shown in FIGS. 8 and 9, knife subassembly 100 includes a pair of pressure pads 102, 104, a top plate 105, a pressure pad stop 106, a knife holder 108, and knife retaining screws 110, 112, 114, and 116. To sever the tape, a pneumatic cylinder 118 is activated to force knife holder 108, knife 98 and pressure pads 102 and 104 downwardly. After the pressure pads come in contact with the tape, springs 120 and 122 are compressed, causing the pressure pads to hold the tape securely against the vacuum pad 104 and the knife block 200. Knife 98, which is secured by retaining screws 110, 112 to knife holder 108 and which is slidably secured by retaining screws 114 and 116 to knife block 200, continues to move downward and severs the tape. Pressure pad stop 106 limits further downward movement of knife 98 and knife holder 108 until pneumatic cylinder 118 returns these items and pressure pads 102 and 104 to their uppermost positions. It will be recognized that a complementary knife subassembly performs the identical operation on tape fed from tape feed apparatus 64. Additionally, all pneumatic operations are controlled from pneumatic control panel 119.

Once the tape has been severed forming a patch P, the patch is transported to horn 30 of welding device 22 by transport arm 96. As best illustrated in FIGS. 7 and 8, transport arm 96 includes a transport base 94, a transport vacuum pad 124, bearing shafts 126 and 128, and pneumatic cylinders 130 and 132. Transport vacuum pad 124 also includes an orifice 134 which communicates with a source of vacuum (not shown).

Activation of pneumatic cylinder 130 causes transport base 94 to move laterally, carried by bearing shafts 126 and 128, to the position shown by the dashed lines in FIG. 7. At this point, the transport base is then in position directly beneath horn 30. Pneumatic cylinder 132 is then activated to cause transport vacuum pad 124 to raise up to the position illustrated by the dashed lines in FIG. 8 to transfer patch P to horn 30. Transfer is accomplished by drawing a vacuum through the central recessed area in horn 30 and deactivating the vacuum drawn on transport vacuum pad 124. This causes patch P to be held in proper position on horn 30 for welding. Pneumatic cylinders 130 and 132 are deactivated causing transport arm 96 to return to its initial position.

Figure 5:
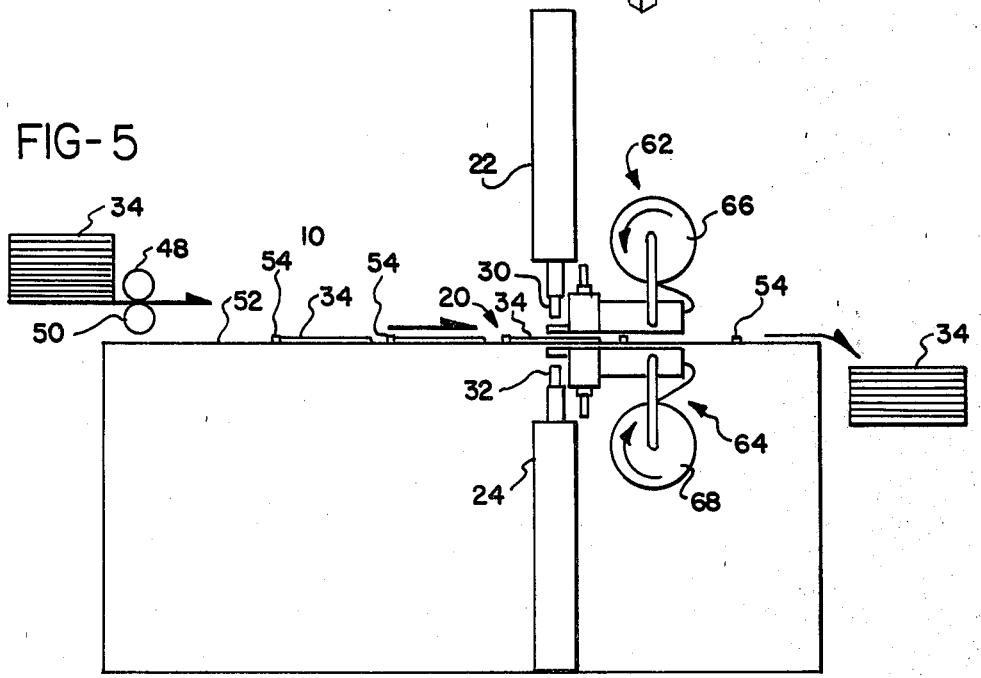
FIG. 5 is a partly schematic view of the flow scheme of substrates through the present apparatus.
Figure 2:
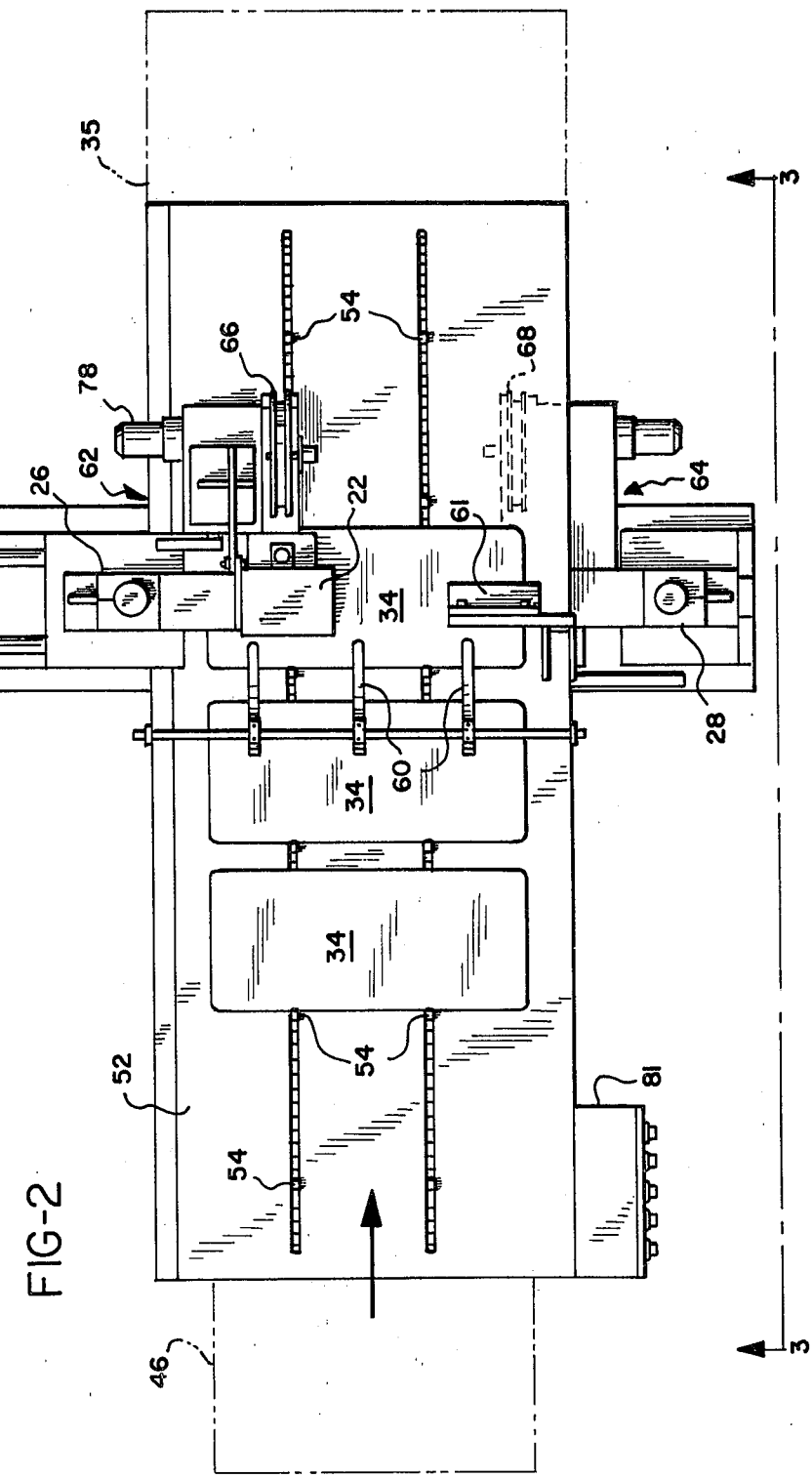
FIG. 2 is a top elevational view of the apparatus of FIG. 1.
Figure 3:
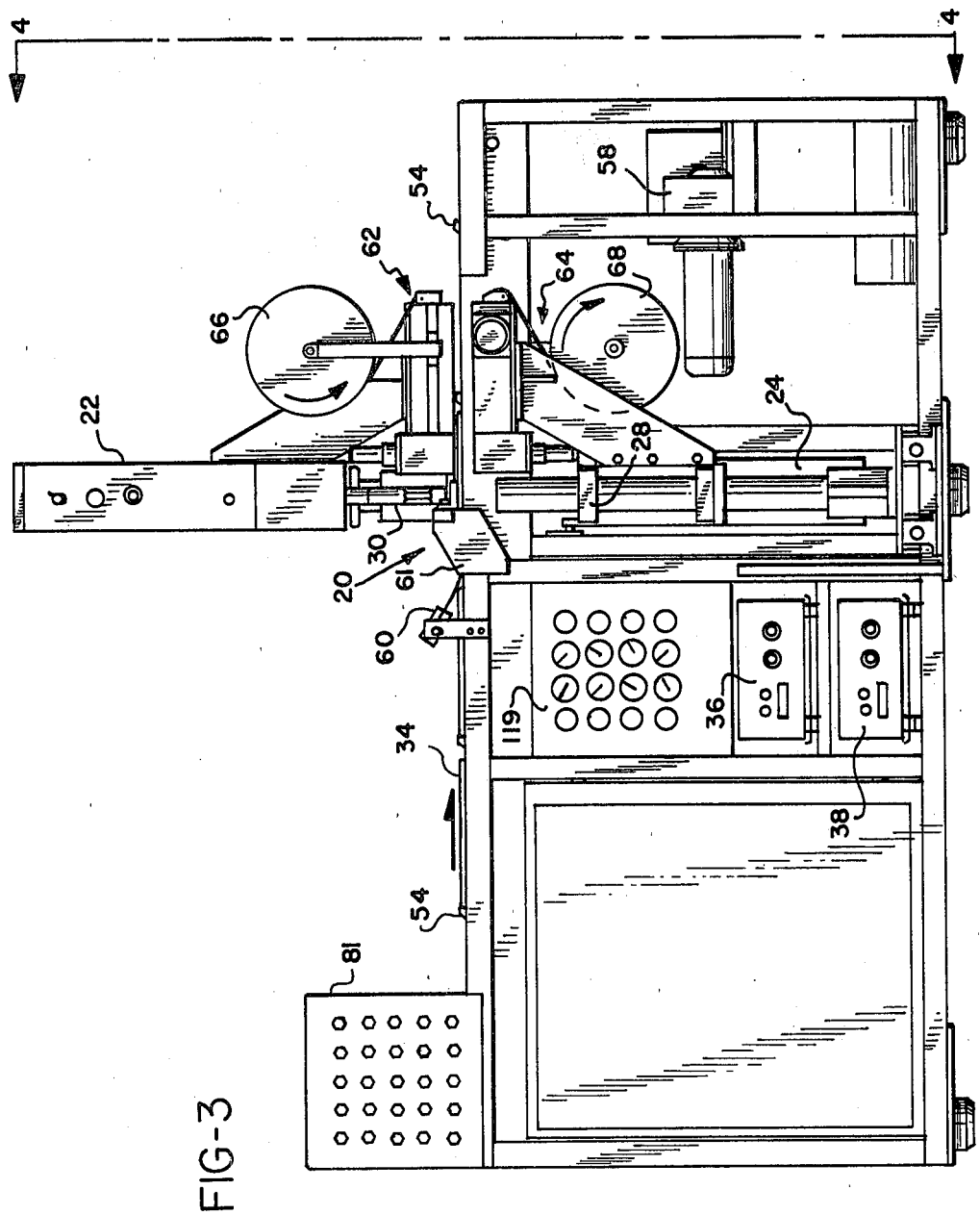
FIG. 3 is a side elevational view taken along line 3—3 in FIG. 2.
Figure 4:
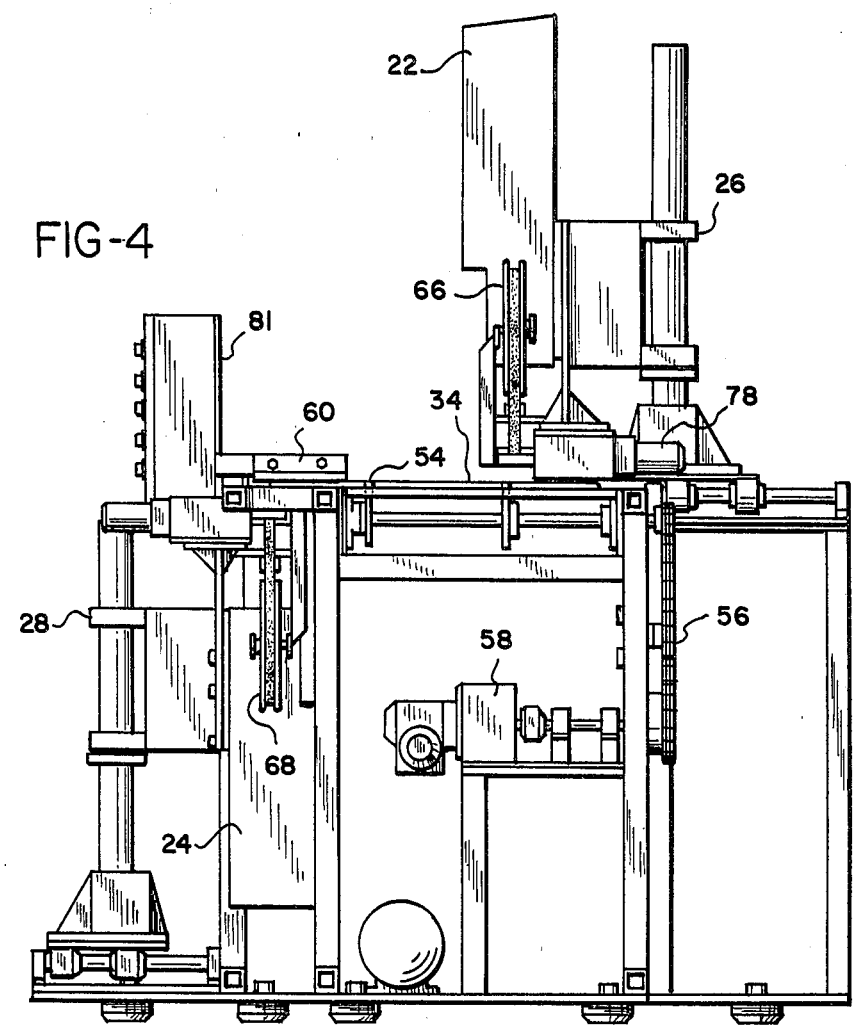
FIG. 4 is an end elevation view taken along line 4—4 in FIG. 3.

The sequence of operations as they occur through the tape attachment apparatus of the present invention are best illustrated schematically in FIGS. 5 and 6A-6F. As shown in FIG. 5, substrates 34 are fed through feed rollers 48 and 50 onto table 52. There pushers 54 engage each substrate and move it forward to work station 20. At work station 20, one or more patches are applied to the top and/or bottom surface of each substrate 34 by welding devices 22 and 24. The substrates with patches applied are then indexed forward for collection.

Figure 6A:
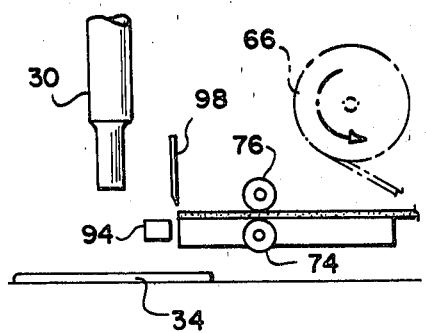
FIGS. 6A–6F are schematic views illustrating the sequence of operations taking place at the work station of the apparatus of the present invention.
Figure 6B:
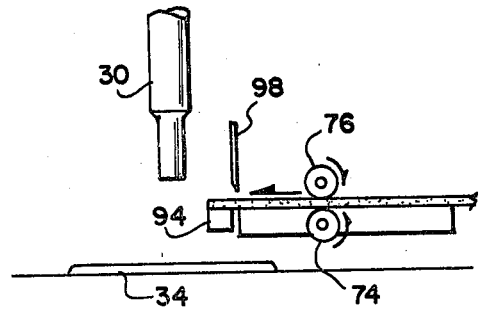
Figure 6C:
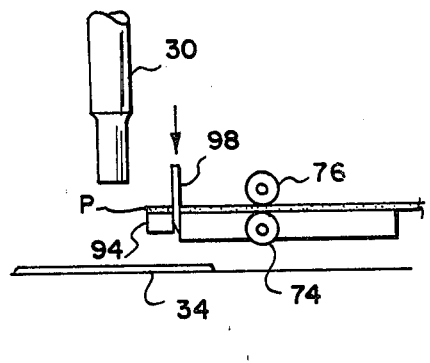
Figure 6D:
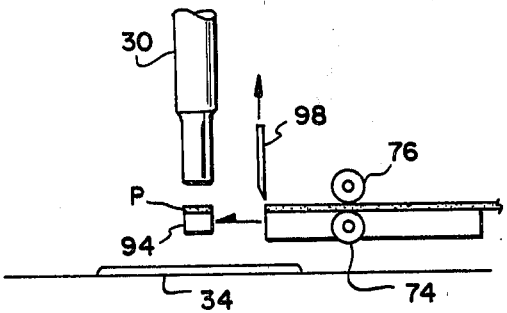
Figure 6E:
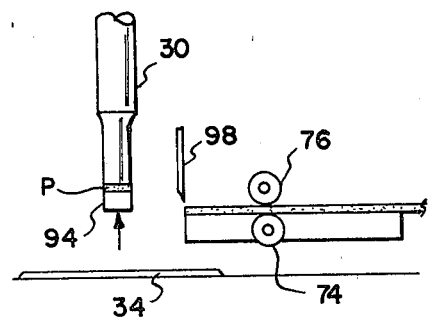
Figure 6F:
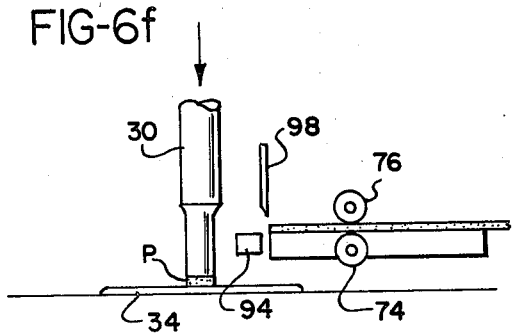

The sequence of operations at work station 20 is shown by FIGS. 6A-6F. Tape is fed from tape roll 66 through feed roller 74 and idler roller 76 onto transport arm 94 (FIG. 6B). Substrate 34 has been previously moved into position beneath welding horn 30. Knife 98 is then activated to sever the tape and form a patch P (FIG. 6C). Transport arm 94 is then moved laterally to a position immediately beneath horn 30 (FIG. 6D) and then raised so that patch P contacts horn 30 (FIG. 6E). A vacuum is then drawn through horn 30 while the vacuum in transport arm 94 is terminated so that patch P is transferred.

Finally, transport arm 94 is returned to its initial position, and horn 30 is lowered and energized to apply patch P to substrate 34. The ultrasonic energy from horn 30 activates the heat-activatable adhesive on the lower surface of the patch so that it can be secured to the substrate by the moderate pressure which is applied by the horn. It has been found that only from about 0.5 to 1.0 seconds of ultrasonic energy is needed to activate the adhesive. Because of the rapid but uniform heating which is achieved, the apparatus of the present invention can apply patches to in excess of twenty substrates per minute.

While the particular forms of apparatus herein described constitute preferred embodiments of the invention, it is to be understood that the invention is not limited to this precise apparatus, and that changes may be made without departing from the scope of the invention, which is defined in the appended claims.

What is claimed is:

1. Apparatus for the application of a patch of tape having a hook or loop fastener surface opposite a heat activated adhesve adhesive surface to a substrate comprising:
   a work station having at least one means for ultrasonically welding a patch of tape to a substrate comprising a horn with an end for engaging the hook or loop fastener surface of said patch of tape and means for vibrating said horn at an ultrasonic rate, means for supplying a substrate to said work station, and
   means for supplying said patch of tape to said work station comprising a transport arm, means for feeding a continuous strip of tape to said transport arm, and means for severing said strip of tape into a patch of predetermined length, said transport arm being relatively moveable between a first position for receiving said patch and a second position for transferring said patch to said horn.

2. The apparatus of claim 1 including means for collecting said substrate after said patch has been welded to said substrate.

3. The apparatus of claim 1 in which said substrate supplying means includes a hopper having a pair of feed rollers and a chain drive including indexing fingers for transporting individual substrates to said work station.

4. The apparatus of claim 1 in which said horn is connected to a source of vacuum which is activated to hold said patch in position thereon.

5. The apparatus of claim 1 in which said horn includes a patch contacting surface substantially about the entire periphery thereof and a recessed central area.

6. The apparatus of claim 1 in which said transport arm is connected to a source of vacuum which is activated to hold said patch in position thereon 7. The apparatus of claim 1 in which said work station is positioned above said substrate.

8. The apparatus of claim 1 in which said work station is positioned below said substrate.

9. The apparatus of claim 1 including a plurality of ultrasonic welding means.

10. The apparatus of claim 9 in which there are ultrasonic welding means positioned both above and below said substrate.

11. Apparatus for the application of patches of tape having a hook or loop fastener surface opposite a heat-activated adhesive surface to opposite sides of a notebook binder cover comprising:
    a work station having at least two means for ultrasonically welding said patches of tape to said binder cover, at least one of said ultrasonic welding means being positioned above said binder cover for application of a patch to the top surface of said binder cover, and at least one of said ultrasonic welding means being positioned below said binder cover for application of a patch to the bottom surface of said binder, each of said ultrasonic welding means comprising a horn having a patch contacting surface substantially about the entire periphery thereof and a recessed central area in communication with a source of vacuum and means for vibrating said horn at a ultrasonic rate,
    means for supplying said binder cover to said work station including a hopper having a pair of feed rollers which feed said binder covers sequentially onto a conveyor means for transporting said binder covers from said hopper to said work station, and
    separate means for supplying said patches to each of said ultrasonic welding means at said work station, each supplying means comprising a transport arm, means for feeding a continuous strip of tape to said transport arm, and means for severing said strip of tape into patches of predetermined length, said transport arm being relatively moveable between a first position for receiving said patches and a second position for transferring said patches to respective ones of said horns.

12. The apparatus of claim 11 including a source of vacuum in communication with the patch carrying surface of each transport arm.

13. The apparatus of claim 11 including means for collecting said binder covers after said patches have been welded to opposite surfaces of said binder covers.

14. The apparatus of claim 11 in which said severing means is a pneumatically operated knife assembly having a blade set at an angle to said strip of tape.

15. A method for the application of patches of tape having a hook or loop fastener surface opposite a heat-activated adhesive surface to opposite sides of a notebook binder cover comprising the steps of:

supplying a notebook binder cover to a work station having a first ultrasonic welding device positioned above said binder cover and a second ultrasonic welding device positioned below said binder cover, feeding predetermined amounts of said hook or loop fastener tape to first and second transport arms, severing said tape to form patches and transporting said patches on said first and second transport arms to the horns of said first and second ultrasonic welding devices, respectively, transferring said patches to the horns of said first and second ultrasonic welding devices, and bringing the horns of said first and second ultrasonic welding devices carrying said patches into contact with opposite sides of said binder cover and applying ultrasonic energy and pressure for a time sufficient to activate said heat-activated adhesive on said patches and secure said patches to said binder cover.

* * * * *